March 3, 1953
W. D. JONES
2,630,302
MIXING APPARATUS
Filed Nov. 16, 1950
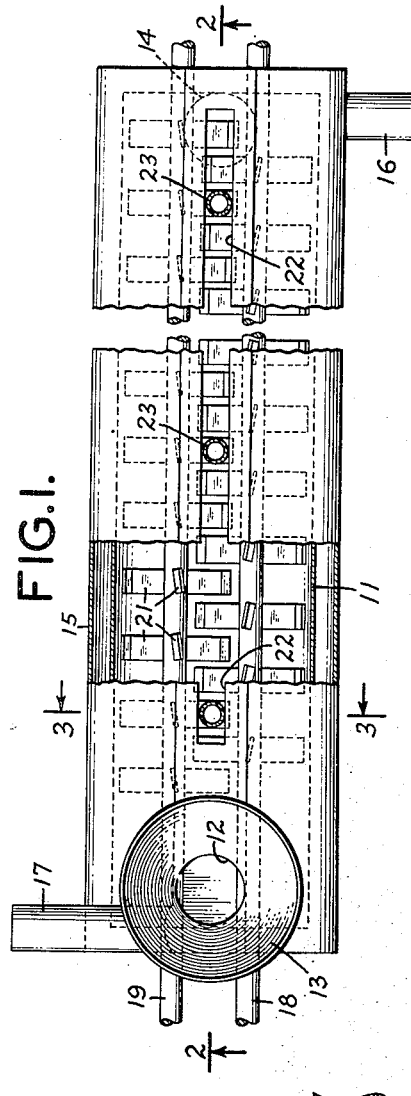
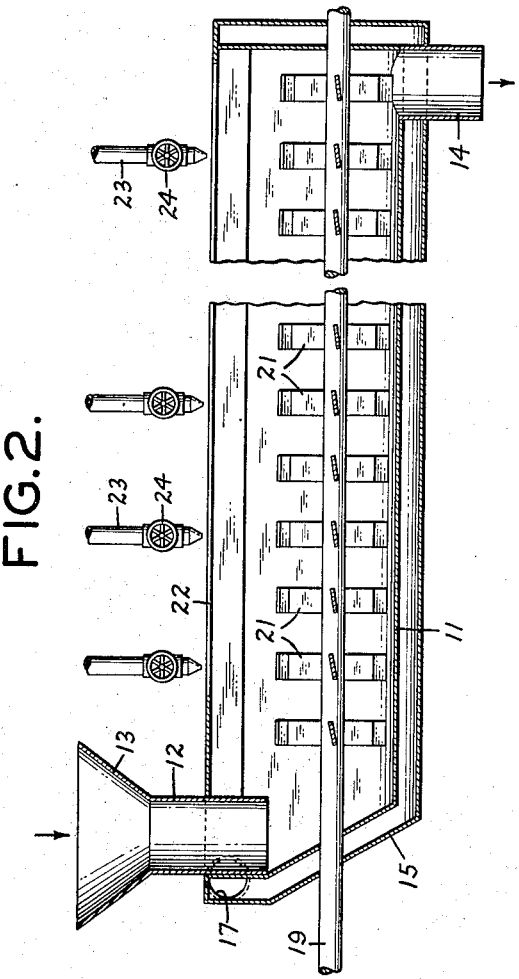
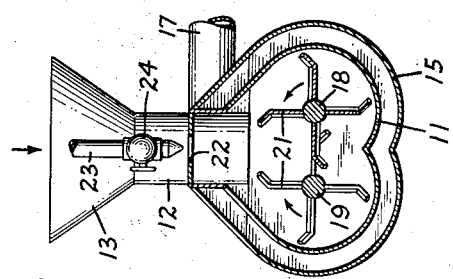
INVENTOR.
WILFORD DONALD JONES
BY
ATTORNEYS.

Patented Mar. 3, 1953

2,630,302

UNITED STATES PATENT OFFICE 2,630,302

MIXING APPARATUS

Wilford Donald Jones, Summit, N. J., assignor to Celanese Corporation of America, New York, N. Y., a corporation of Delaware Application November 16, 1950, Serial No. 195,989

2 Claims. (Cl. 259—6)

This invention relates to mixing apparatus and relates more particularly to mixing apparatus in which the continuous polymerization of organic compounds may be readily effected.

In Jones et al., U. S. application No. 177,763, filed August 4, 1950, there is disclosed a process for the production of polyurethanes by the reaction of a bis-chloroformate with a diamine. According to one embodiment of the process set forth in the aforementioned application, a solution of the bis-chloroformate in toluene is dispersed, with the aid of a dispersing agent, in an aqueous solution of the diamine that has been acidified with hydrofluoric acid to a pH of below about 7 or preferably below about 6. The polymerization is then caused to proceed by adding an alkaline material to said dispersion to raise the pH thereof to above about 8 or preferably to between about 10 and 12. As the polymer is formed, it precipitates from the reaction mixture in the form of a slurry. To obtain a polymer having a high degree of uniformity it is desirable to insure a thorough mixing and blending of the reactants and the alkaline material and to maintain a close control on the temperature of the reaction mixture. When the concentration of the reactants exceeds about 0.25 mole per liter of solvent, it is difficult to achieve this thorough mixing and blending on a continuous basis in conventional mixing apparatus because of the high viscosity of the polymer slurries that are formed. It is also difficult to maintain a sufficiently close control of the temperature of the reaction mixture because of the large amount of heat that is evolved as the polymerization proceeds.

It is an important object of this invention to provide a mixing apparatus in which the continuous polymerization of organic compounds may be readily effected.

A further object of this invention is to provide a mixing apparatus in which the continuous polymerization of organic compounds may be readily effected with a thorough mixing and blending of all the reactants and with a close control on the temperature of the reaction mixture.

Other objects of this invention, together with certain details of construction and combinations of parts, will be apparent from the following detailed description and claims.

According to the present invention, there is provided a mixing apparatus including a tubular shell through which the reactants pass continuously. Means are provided to introduce small increments of alkaline material into the reaction mixture at a number of points spaced along the longitudinal axis of the tubular shell so as to cause the polymerization to proceed gradually and to prevent the liberation of an excessive amount of heat at any one point. In addition, the tubular shell is enclosed within a jacket through which a heat transfer medium is passed to remove the heat of polymerization and to maintain a close control of the temperature of the reaction mixture. Positioned within the tubular shell are a pair of counter-rotating shafts that extend parallel to the longitudinal axis of said shell, which shafts are provided with a plurality of intermeshing stirring blades that serve to effect a thorough blending and mixing of the reactants and the alkaline material and which have a small forward pitch to move the polymer slurry through said shell as it is formed. Advantageously, the wall of the tubular shell is contoured in such fashion that the stirring blades will sweep across the inner surface thereof to prevent adherence of the polymer thereto and to insure good heat transfer to all of the reaction mixture.

A preferred embodiment of this invention is shown in the accompanying drawing wherein Fig. 1 is a top plan view of the mixing apparatus with certain parts broken away, Fig. 2 is a longitudinal cross-sectional view of the mixing apparatus taken along the line 2—2 in Fig. 1 in the direction of the arrows, and Fig. 3 is a transverse cross-sectional view of the mixing apparatus taken along the line 3—3 in Fig. 1 in the direction of the arrows.

Referring now to the drawing, the reference numeral 11 designates a tubular shell into which the reactants to be polymerized are introduced through an entrance conduit 12 provided with a funnel-shaped inlet 13, and from which tubular shell the polymer slurry is drawn through a discharge conduit 14. The tubular shell 11 is enclosed within a jacket 15 through which jacket a heat transfer medium is caused to flow from a conduit 16, and from which jacket said heat transfer medium is discharged through a conduit 17. Positioned within the tubular shell 11 are a pair of counter-rotating shafts 18 and 19 driven by any suitable means (not shown) and provided with a plurality of intermeshing stirring blades 21. As shown in Fig. 3 of the drawing, the wall of the tubular shell 11 is contoured in such fashion that the stirring blades 21 sweep across the inner surface thereof and continuously remove the material adjacent thereto so as to insure good heat transfer to all of the reaction mixture. The stirring blades 21 are secured to the shafts 18 and 19 with a small forward pitch to cause the reaction mixture to move forward through the tubular shell 11 to the discharge conduit 14.

The upper surface of tubular shell 11 is provided with an opening 22 extending substantially the entire length thereof, above which opening there are positioned a plurality of conduits 23, provided with valves 24, through which an alkaline material may be introduced in small increments and at a controlled rate, into the reaction mixture as it moves through said tubular shell. The introduction of the alkaline material into the reaction mixture in small increments causes the polymerization to proceed gradually and prevents the generation of an excessive amount of heat at any one point. The conduits 23 are advantageously positioned above and midway between the shafts 18 and 19, said shafts being rotated so as to move the stirring blades 21 towards each other in the upper portion of the tubular shell 11. In this way the alkaline material will be introduced into the reaction mixture at the longitudinal space between the two stirred areas and will be rapidly and thoroughly blended and mixed into said reaction mixture.

Alternatively, or in addition, the shafts 18 and 19 and the stirring blades 21 may be hollowed out and have apertures extending therethrough, and the alkaline material may be introduced into the reaction mixture through said apertures.

It is to be understood that the foregoing detailed description is given merely by way of illustration and that many variations may be made therein without departing from the spirit of my invention.

Having described my invention, what I desire to secure by Letters Patent is:

1. A mixing apparatus for continuously carrying out an exothermic chemical reaction in which the reaction mixture is highly viscous, comprising a tubular shell having an entrance conduit at one end and a discharge conduit at the other end thereof, a pair of counter-rotating shafts positioned within said tubular shell, each of said shafts being provided, along the length thereof, with intermeshing stirring blades having a small pitch, the blades on one shaft being staggered in relation to the blades on the other shaft, and the pitch of the blades on one shaft being opposite to the pitch of the blades on the other shaft whereby, when the shafts are counter-rotated, the blades on both shafts move the material being mixed in the same direction towards said discharge conduit, the wall of said tubular shell being contoured in such fashion and the lengths of said stirring blades being such that said blades sweep across the inner surface of the wall of said tubular shell, a jacket for the passage of a heat transfer medium enclosing said tubular shell, a plurality of conduits having outlets positioned directly above said stirring blades which sweep across said inner surface for introducing material into said tubular shell at a number of points spaced along the longitudinal axis of said shell.

2. A mixing apparatus for carrying out an exothermic chemical reaction in which the reaction mixture is highly viscous, comprising a tubular shell having an entrance conduit at one end and a discharge conduit at the other end thereof, a pair of counter-rotating shafts positioned within said tubular shell, each of said shafts being provided, along the length thereof, with intermeshing stirring blades having a small pitch, the blades on one shaft being staggered in relation to the blades on the other shaft, and the pitch of the blades on one shaft being opposite to the pitch of the blades on the other shaft whereby, when the shafts are counter-rotated, the blades on both shafts move the material being mixed in the same direction towards said discharge conduit, the wall of said tubular shell being contoured in such fashion and the lengths of said stirring blades being such that said blades sweep across the inner surface of the wall of said tubular shell, a jacket for the passage of a heat transfer medium enclosing said tubular shell, said tubular shell having an opening extending substantially the entire length of the upper surface thereof, a plurality of conduits having outlets directly above said opening and directly above said stirring blades which sweep across said inner surface for introducing material into said tubular shell at a number of points spaced along the longitudinal axis of said shell.

WILFORD DONALD JONES.

REFERENCES CITED

The following references are of record in the file of this patent:

UNITED STATES PATENTS

| Number | Name | Date |
| --- | --- | --- |
| 616,373 | Upton | Dec. 20, 1898 |
| 939,392 | Chambers | Nov. 9, 1909 |
| 1,575,458 | Stonesifer | Mar. 2, 1926 |
| 1,948,871 | Quehl | Feb. 27, 1934 |
| 2,092,992 | Thalman | Sept. 14, 1937 |
| 2,445,928 | Sommer | July 27, 1948 |